United States Patent
Ishikawa (10) Patent No.: US 6,697,522 B1
(45) Date of Patent: Feb. 24, 2004

(54) IMAGE PROCESSING APPARATUS AND METHOD ENABLING PROPER CORRECTION OF CHROMATIC ABERRATION

(75) Inventor: Atsushi Ishikawa, Anjo (JP)

(73) Assignee: Minolta Co., Ltd., Osaka (JP)

( * ) Notice: Subject to any disclaimer, the term of this patent is extended or adjusted under 35 U.S.C. 154(b) by 623 days.

(21) Appl. No.: 09/670,807

(22) Filed: Sep. 28, 2000

(30) Foreign Application Priority Data

Sep. 29, 1999 (JP) ............................................. 11-276036

(51) Int. Cl.$^7$ ................................................. G06K 9/00
(52) U.S. Cl. ....................................... 382/167; 358/518
(58) Field of Search .............................. 382/162–167; 358/504–540; 345/598–610; 348/587–599

(56) References Cited

U.S. PATENT DOCUMENTS

| | | | | |
|---|---|---|---|---|
| 5,457,548 A | * | 10/1995 | Funada ........................ | 358/520 |
| 5,726,780 A | * | 3/1998 | Hirota et al. ............... | 358/520 |
| 5,742,410 A | * | 4/1998 | Suziki ........................ | 358/518 |
| 5,867,285 A | * | 2/1999 | Hirota et al. ............... | 382/167 |
| 6,323,959 B1 | * | 11/2001 | Toyama et al. ............. | 358/518 |
| 6,363,220 B1 | * | 3/2002 | Ide ............................. | 348/345 |
| 6,587,224 B1 | * | 7/2003 | Nabeshima et al. ........ | 348/475 |

FOREIGN PATENT DOCUMENTS

| | | |
|---|---|---|
| JP | 5-122542 | 5/1993 |
| JP | 11-8734 | 1/1999 |
| JP | 11-69105 | 3/1999 |

* cited by examiner

Primary Examiner—Jingge Wu
(74) Attorney, Agent, or Firm—McDermott, Will & Emery (57) ABSTRACT

An image processing apparatus includes a reading unit reading an original document image, a correction coefficient calculating unit for calculating a chromatic aberration correction coefficient by using RGB data of the read original document image, a memory unit for temporarily storing the calculated chromatic aberration correction coefficient, a correction coefficient correcting unit for calling the stored chromatic aberration correction coefficient and correcting it, and a chromatic aberration correcting unit for correcting chromatic aberration of the RGB data read by the reading unit by using the corrected chromatic aberration correction coefficient. The correction coefficient correcting unit corrects a chromatic aberration correction coefficient for a target pixel by using a chromatic aberration correction coefficient for a pixel adjoining the target pixel and accordingly an adequate chromatic aberration correction coefficient is determined. In this way, an image processing apparatus capable of easily correcting chromatic aberration according to an actual state of chromatic aberration can be provided.

14 Claims, 11 Drawing Sheets

AVERAGE FILTER (WEIGHTING COEFFICIENT)

FIG.7A BEFORE CORRECTION

FIG.7B AFTER CORRECTION

FIG.14
LADDER PATTERN (LINE/N-DOT)

FIG.15

IMAGE PROCESSING APPARATUS AND METHOD ENABLING PROPER CORRECTION OF CHROMATIC ABERRATION

This application is based on application No. 11-276036 filed in Japan, the contents of which is hereby incorporated by reference.

BACKGROUND OF THE INVENTION

1. Field of the Invention

The present invention relates to image processing apparatuses and particularly to an image processing apparatus that corrects chromatic aberration caused by an optical system in digital processing of image information obtained through optical reading of an original document image.

2. Description of the Related Art

Figure 10:
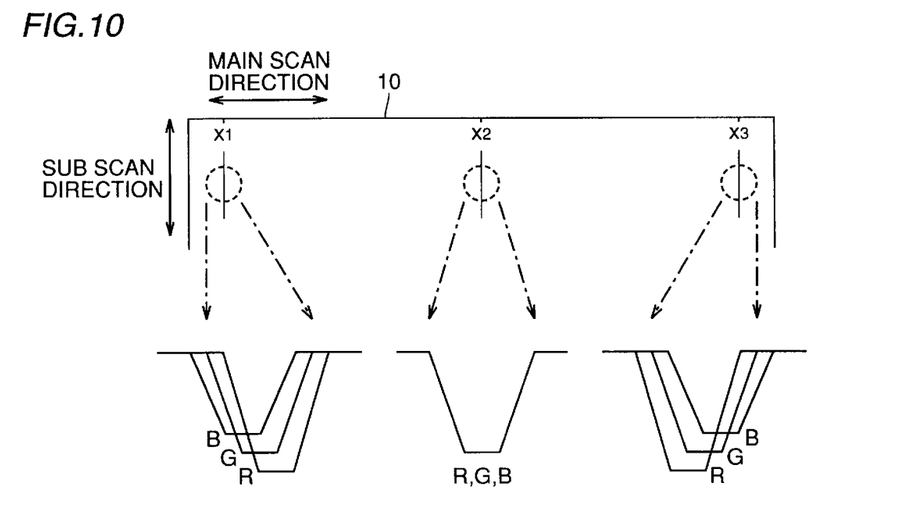
FIG. 10 illustrates the principle of chromatic aberration of a lens.

Regarding conventional digital copying machines and the like, color deviation (chromatic aberration) of an optical system occurs on edges in the main scanning direction, due to chromatic aberration of a lens employed in a reading unit. FIG. 10 illustrates the principle of chromatic aberration of a lens. It is supposed here that black lines are printed on an original document 10 at respective positions x1, x2 and x3 in the main scanning direction.

Referring to FIG. 10, light rays reflected from the black line at the position x2 are passed straight through the center of a lens and then focused on a CCD (charge-coupled device) and accordingly the reflected light rays are focused at the same position. In other words, chromatic aberration of the lens does not affect the reflected light rays. The CCD can then read the reflected light rays as black data including three colors of R (red), G (green) and B (blue) having the same barycenters and peak values.

On the other hand, light rays reflected from the black line at the position x1 or x3 are directed from the edge region of the lens and focused on the CCD, and therefore affected by the chromatic aberration of the lens. Specifically, light rays of RGB incident on the lens are refracted according to respective wavelengths and focused at different positions so that respective barycenters and peak values of these three colors differ from each other. In particular, as shown in the lower part of FIG. 10, long-wavelength light (R) condenses inward on the CCD while short-wavelength light (B) condenses outward on the CCD.

Figure 11:
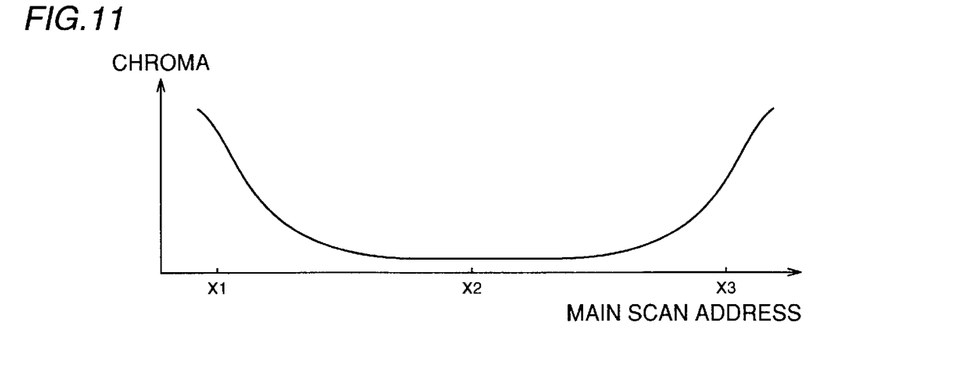
FIG. 11 shows chroma relative to addresses in the main scanning direction for illustrating the chromatic aberration.

FIG. 11 shows chroma relative to addresses in the direction of main scanning for explaining the above chromatic aberration. As seen from FIG. 11, the chroma relative to edge parts and therearound such as x1 and x3 in the main scanning direction is higher because of the influence of chromatic aberration while the chroma relative to the central part like x2 which is not affected by the chromatic aberration is lower as compared therewith.

The chromatic aberration as discussed above causes no problem for an image having a relatively even density distribution such as a color patch. However, for an image where density abruptly changes such as a character image, the chromatic aberration generates color deviation on the edge portion thereof. Especially, on the edge of a black character, an erroneous judgement due to the chromatic aberration results in blurring of color around the character, partial loss of the character, and the like.

A lens of high quality is thus required in a PPC (plain paper electric copying machine) employing a color CCD, however, such a lens cannot satisfactorily meet requirements. Specifically, improvement of lens performance is accompanied by increase in size of a lens system, resulting in increase in size of an entire machine including an optical system of a scanner. Further, there is a considerable difference in quality and performance between lens parts. A method is then necessary for correcting the chromatic aberration finally by an image processing system.

A method is now described of correcting chromatic aberration that has been employed in an image processing system of a conventional art. The chromatic aberration is generally corrected by mixing data on pixels adjoining each other using chromatic aberration correction coefficients as represented by the following equations:

$R(n)=a1(n){\times}R(n-1)+a2(n){\times}R(n)+a3(n){\times}R(n+1)$, $G(n)=G(n)$, $B(n)=a3(n){\times}B(n-1)+a2(n){\times}B(n)+a1(n){\times}B(n+1)$, where n represents the position of a target pixel relative to a reference position of the main scanning, and a1(n), a2(n) and a3(n) represent correction coefficients for the target pixel which is the nth pixel.

Figure 12:
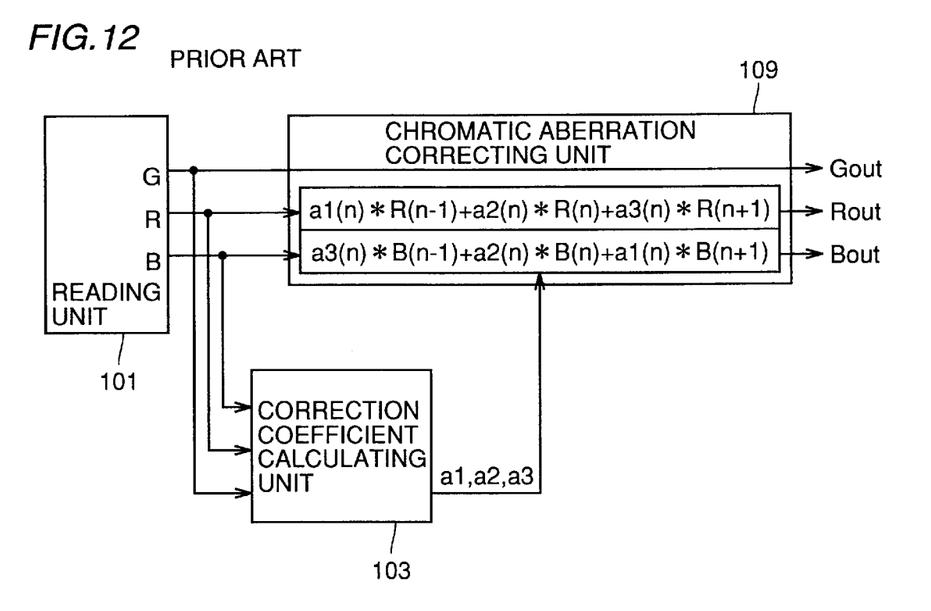
FIG. 12 is a block diagram illustrating a general method of correcting chromatic aberration according to a conventional art.

FIG. 12 is a block diagram illustrating a general method of correcting chromatic aberration according to the conventional art. Referring to FIG. 12, in order to correct chromatic aberration according to the conventional art, data on RGB read by a reading unit 101 is corrected by a chromatic aberration correcting unit 109 using correction coefficients (a1, a2, a3) calculated by a correction coefficient calculating unit 103.

If predetermined values are used respectively as the correction coefficients (a1, a2, a3), correction would be accomplished for a state different from the actual state of chromatic aberration since manufactured lenses have different qualities and performances. It is thus necessary to determine the actual state of chromatic aberration for each machine and then determine correction coefficients a1(n), a2(n) and a3(n) which are appropriate for each machine. However, measurement of the chromatic aberration for each machine is inefficient in terms of production efficiency and the like. Accordingly, a method is actually employed as explained below.

Figure 13:
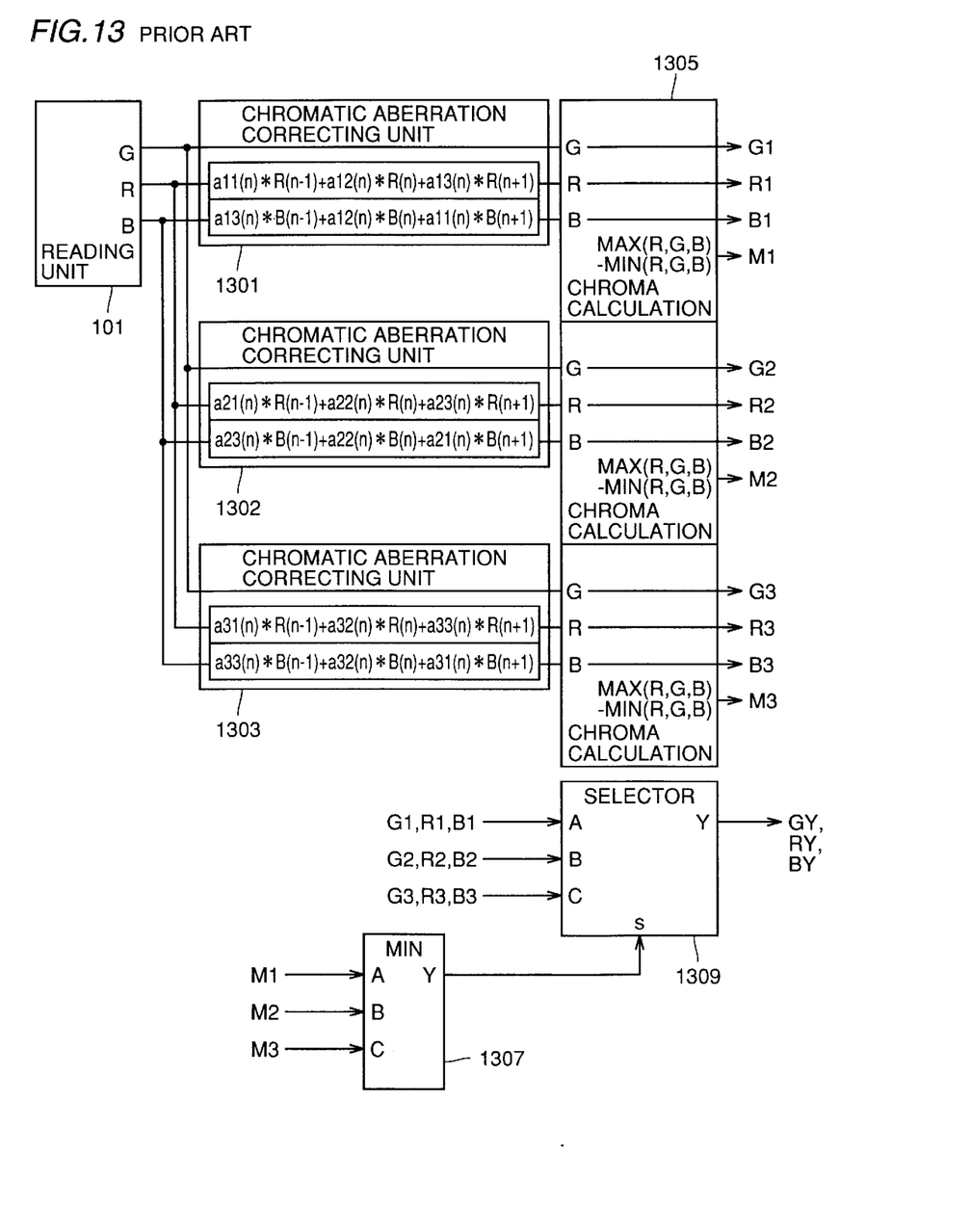
FIG. 13 illustrates pseudo-calculation of correction coefficients performed by a correction coefficient calculating unit in FIG. 12.

FIG. 13 illustrates pseudo-calculation of correction coefficients by correction coefficient calculating unit 103 in FIG. 12. Referring to FIG. 13, RGB data read by reading unit 101 is transmitted first to chromatic aberration correcting units 1301, 1302 and 1303 in respective blocks where three sets of chromatic aberration correction coefficients ([a11, a12, a13], [a21, a22, a23], [a31, a32, a33]) calculated at the time of lens design are used to correct chromatic aberration for each pixel ([R1, G1, B1], [R2, G2, B2], [R3, G3, B3]).

Chroma data (MAX(R,G,B)−MIN(R,G,B)) is then calculated for each block (M1, M2, M3) by a chroma calculating unit 1305 and thereafter the minimum one (Y) of them is determined by a MIN unit 1307. RGB data ([RY, GY, BY]) is finally determined by a selector 1309 that is data obtained by correction of chromatic aberration associated with the minimum value Y.

In this way, RGB data of any block that allows the chroma data to be minimum for respective colors is selected to calculate chromatic aberration correction coefficients in a pseudo-manner for correcting chromatic aberration. In other words, instead of using fixed chromatic aberration correction coefficients calculated for each machine, optimum chromatic aberration correction coefficients are selected from three sets of chromatic aberration correction coefficients which are calculated in advance. Then, the optimum chromatic aberration correction coefficients are used to accomplish correction of chromatic aberration.

Since the influence of chromatic aberration is noticeable on the edge part of a black character and is inconspicuous on the remaining part thereof, such a chromatic aberration correction has been considered to be satisfactory in the practical use. Accordingly, this method has been regarded as the one which saves labor of measuring chromatic aberration for each machine and thus achieves an easier and more appropriate correction of chromatic aberration.

However, according to this conventional art, an image processing apparatus always selects, from predetermined chromatic aberration correction coefficients, those correction coefficients which provide the minimum chroma. Therefore, depending on image data, the selected correction coefficients may be different from those suitable for the actual chromatic aberration. Consequently, a problem occurs that a thin line of a single color for example RGB cannot be reproduced.

Figure 14:
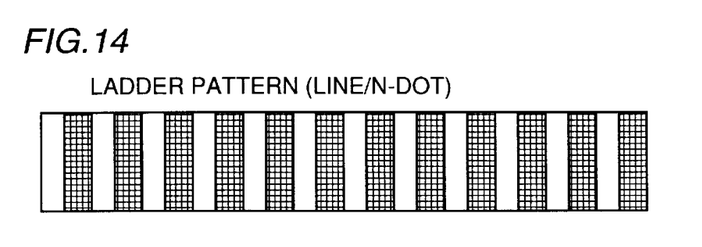
FIG. 14 shows an image of an original document as a ladder pattern with one line/n-dot.
Figure 15:
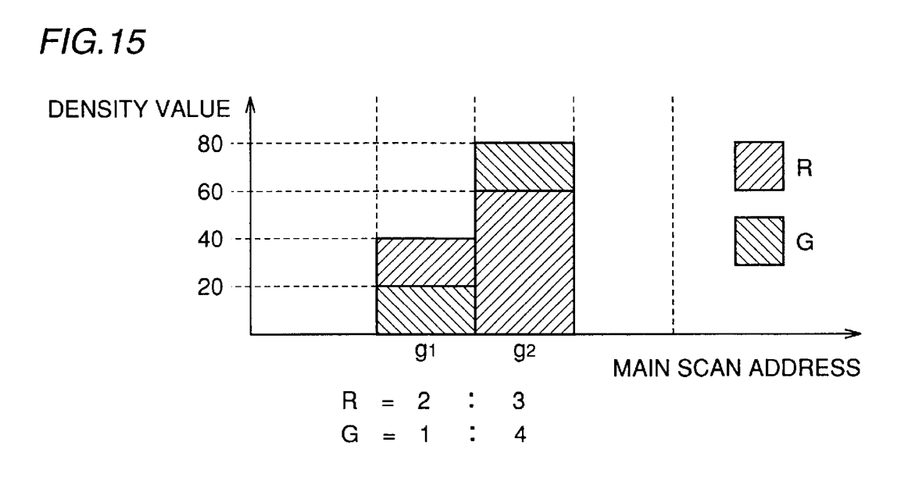
FIG. 15 shows density values obtained by reading pixels adjacent to each other in the right edge region of the ladder pattern in FIG. 14.

FIG. 14 shows an image of an original document having a ladder pattern with one line per n-dot. FIG. 15 shows density values obtained by reading pixels adjoining each other in the right edge region of the ladder pattern in FIG. 14. As discussed above, R on the edge of the original document image deviates inward while B deviates outward. Consequently, when the ladder pattern as shown in FIG. 14 is read, respective barycenters of RGB deviate from each other on the edge of the black line in the edge region.

R and G thus have respective density values different from each other as shown in FIG. 15. It is noted that B is not shown here for allowing the difference to be distinguished easily. Respective density values of R and G should inherently be equal to each other when a black line is read. However, R has a density value of 40 higher than that of 20 of G when a pixel g1 is read while R has a density value of 60 lower than that of 80 of G when an adjacent pixel g2 is read due to chromatic aberration.

When such density values are obtained, the extent of deviation of colors can easily be calculated based on data values of a sample to be read if the sample is originally known. Actually, however, any sample to be read is unknown at the beginning and it is thus impossible to judge whether the deviation of barycenters as shown is caused by chromatic aberration or it is normal data.

According to the conventional art, chromatic aberration is corrected to achieve the minimum chroma all the time. Therefore, in terms of each pixel, selected chromatic aberration correction coefficients for a pixel may produce an effect which is entirely different from that produced by chromatic aberration correction coefficients for a pixel adjacent to that pixel, for example.

Actually, it seems unlikely that a state of chromatic aberration for one pixel is entirely different from that for an adjacent pixel. If chromatic aberration correction coefficients producing entirely different effects are selected, chromatic aberration, which actually occurs, is improperly corrected. For this reason, a thin line of a single color such as a thin green line or a thin red line could be corrected to a thin black line having a low chroma and thus cannot be reproduced appropriately.

In view of this, Japanese Patent Laying-Open No. 11-69105 discloses a technique of correcting color deviation suitable for an actual state of chromatic aberration. According to a disclosed method, chromatic aberration correction coefficients are actually calculated instead of selection of optimum coefficients from predetermined sets of chromatic aberration correction coefficients.

Specifically, according to this method, appropriate chromatic aberration correction coefficients are calculated based on spatial frequency components of an original image to be read.

However, the technique disclosed in Japanese Patent Laying-Open No. 11-69105 is difficult to implement as hardware. Even if it is possible, the resultant circuit is great in size, raising the cost.

SUMMARY OF THE INVENTION

One object of the present invention is accordingly to provide an image processing apparatus capable of easily correcting chromatic aberration according to an actual state of chromatic aberration by correcting chromatic aberration correction coefficients.

This object is accomplished by an image processing apparatus including following components. Specifically, according to one aspect of the invention, the image processing apparatus includes an image reading unit, a calculating unit calculating a chromatic aberration correction coefficient by using image data read by the image reading unit, a first correcting unit correcting the calculated chromatic aberration correction coefficient, and a second correcting unit correcting image data of an original read by the image reading unit by using the corrected chromatic aberration correction coefficient.

According to the present invention, the calculated chromatic aberration correction coefficient is corrected and thus it is possible to provide an image processing apparatus capable of easily correcting chromatic aberration according to an actual state of chromatic aberration.

Preferably, the image processing apparatus further includes a storing unit storing the calculated chromatic aberration correction coefficient. The first correcting unit includes a first reading unit reading the stored chromatic aberration correction coefficient from the storing unit, and a second reading unit reading from the storing unit a chromatic aberration correction coefficient adjoining the read chromatic aberration correction coefficient. The chromatic aberration correction coefficient read by the first reading unit is corrected by using the adjoining chromatic aberration correction coefficient read by the second reading unit.

In this way, the chromatic aberration correction coefficient is corrected by using the adjoining chromatic aberration correction coefficient. It is then avoided to inconveniently select improper chromatic aberration correction coefficients respectively for a target pixel and a pixel adjacent thereto.

Preferably, the first correcting unit takes an average of the chromatic aberration correction coefficient read by the first reading unit and the adjoining chromatic aberration correction coefficient read by the second reading unit to correct the chromatic aberration correction coefficient read by the first reading unit.

In this way, the chromatic aberration correction coefficient can be corrected in a relatively easy manner because of a light load of a circuit for calculating the average.

Preferably, the first correcting unit takes a median of the chromatic aberration correction coefficient read by the first reading unit and the adjoining chromatic aberration correction coefficient read by the second reading unit to correct the chromatic aberration correction coefficient read by the first reading unit.

In this way, the median is selected in a certain region and accordingly any spike noise occurring in the calculated chromatic aberration correction coefficient is eliminated.

Preferably, the first correcting unit performs expansion and erosion processing on the chromatic aberration correction coefficient read by the first reading unit by using the adjoining chromatic aberration correction coefficient read by the second reading unit so as to correct the chromatic aberration correction coefficient read by the first reading unit.

In this way, the expansion and erosion processing is carried out to allow any noise produced in the calculated chromatic aberration correction coefficient to be eliminated.

Preferably, the calculating unit performs an arithmetic operation for correcting chromatic aberration by using a plurality of chromatic aberration correction coefficients and selects a chromatic aberration correction coefficient which allows chroma data obtained by the arithmetic operation to be minimum.

In this way, the chromatic aberration correction coefficient allowing chroma data to be minimum is selected from the multiple number of chromatic aberration correction coefficients. The chromatic aberration correction coefficient before corrected can easily and appropriately be determined.

Preferably, the second correcting unit multiplies the image data by the corrected chromatic aberration correction coefficient and performs addition on resultant products to correct the image data.

In this way, image data is properly corrected by using the corrected chromatic aberration correction coefficient.

According to another aspect of the invention, an image processing apparatus includes an image reading unit, a calculating unit calculating a chromatic aberration correction coefficient for each pixel in a main scanning direction by using image data read by the image reading unit, a first correcting unit correcting a chromatic aberration correction coefficient for a target pixel by using a chromatic aberration correction coefficient for a pixel adjoining the target pixel, and a second correcting unit correcting image data of an original read by the image reading unit by using the corrected chromatic aberration correction coefficient.

According to the present invention, a chromatic aberration correction coefficient calculated for each pixel in the main scanning direction is corrected by using a chromatic aberration correction coefficient for an adjoining pixel. It is thus avoided to inconveniently use improper chromatic aberration correction coefficients for the target pixel and the adjoining pixel in the main scanning direction respectively.

Preferably, the first correcting unit performs matrixing operation based on an average filter to correct the chromatic aberration correction coefficient.

In this way, the chromatic aberration correction coefficient can be corrected in a relatively easy manner because of a light load of a circuit for performing matrixing based on the average filter.

Preferably, the first correcting unit performs matrixing operation based on a median filter to correct the chromatic aberration correction coefficient.

In this way, a median is selected in a certain region in a matrix according to the matrixing based on the median filter, and accordingly any spike noise occurring in the calculated chromatic aberration correction coefficient can be prevented.

Preferably, the first correcting unit performs matrixing operation based on a morphology filter to correct the chromatic aberration correction coefficient.

In this way, any noise produced in the calculated chromatic aberration correction coefficient can be eliminated by the matrixing based on the morphology filter.

Preferably, the calculating unit performs arithmetic operation for correcting chromatic aberration of image data of each pixel by using a plurality of chromatic aberration correction coefficients and selects a chromatic aberration correction coefficient which allows chroma data obtained by the arithmetic operation to be minimum.

In this way, the chromatic aberration correction coefficient before corrected can easily and properly be determined by selecting from the multiple number of chromatic aberration correction coefficients the chromatic aberration correction coefficient allowing the chroma data to be minimum.

Preferably, the second correcting unit multiplies the image data by the corrected chromatic aberration correction coefficient and performs addition on resultant products to correct the image data.

In this way, image data is properly corrected by using the corrected chromatic aberration correction coefficient.

According to a further aspect of the invention, an image processing method for correcting chromatic aberration of image data read by an image reading unit includes the steps of calculating a chromatic aberration correction coefficient by using the image data read by the image reading unit, correcting the calculated chromatic aberration correction coefficient, and correcting by using the corrected chromatic aberration correction coefficient image data of an original read by the image reading unit.

According to the present invention, the calculated chromatic aberration correction coefficient is corrected and thus it is possible to provide an image processing method which enables an easy correction of chromatic aberration according to an actual state of chromatic aberration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described in conjunction with the drawings.

First Embodiment

Figure 1:
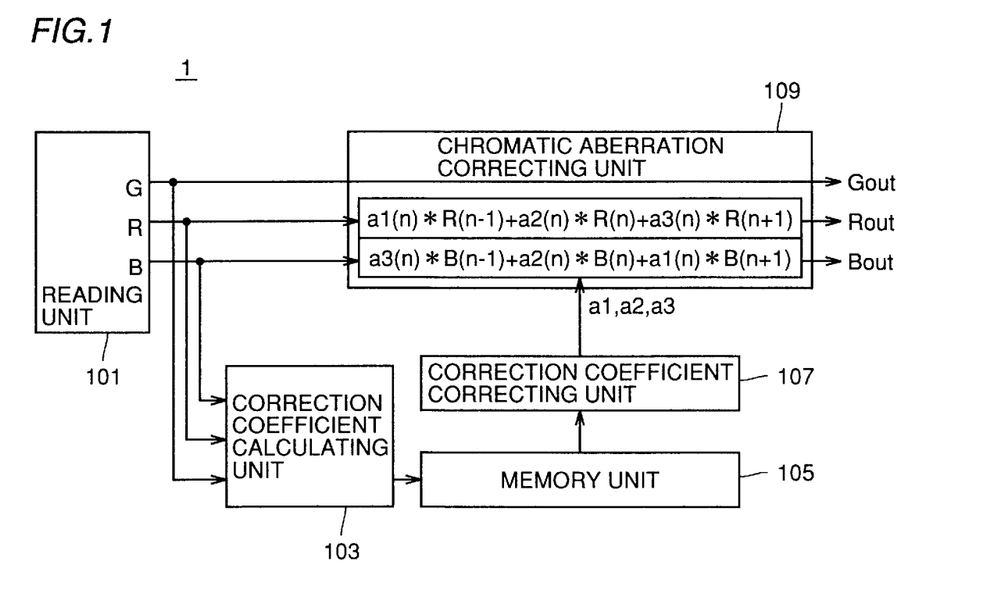
FIG. 1 is a block diagram showing an entire structure of an image processing apparatus according to a first embodiment of the present invention.

Referring to FIG. 1, an image processing apparatus 1 includes a reading unit 101 for reading an original document image, a correction coefficient calculating unit 103 for calculating a chromatic aberration correction coefficient by using RGB data of the read original document image, a memory unit 105 for temporarily storing the calculated chromatic aberration correction coefficient, a correction coefficient correcting unit 107 for calling the stored chromatic aberration correction coefficient and correcting it, and a chromatic aberration correcting unit 109 for correcting chromatic aberration of the RGB data read by reading unit 101 by using the corrected chromatic aberration correction coefficient.

Figure 2:
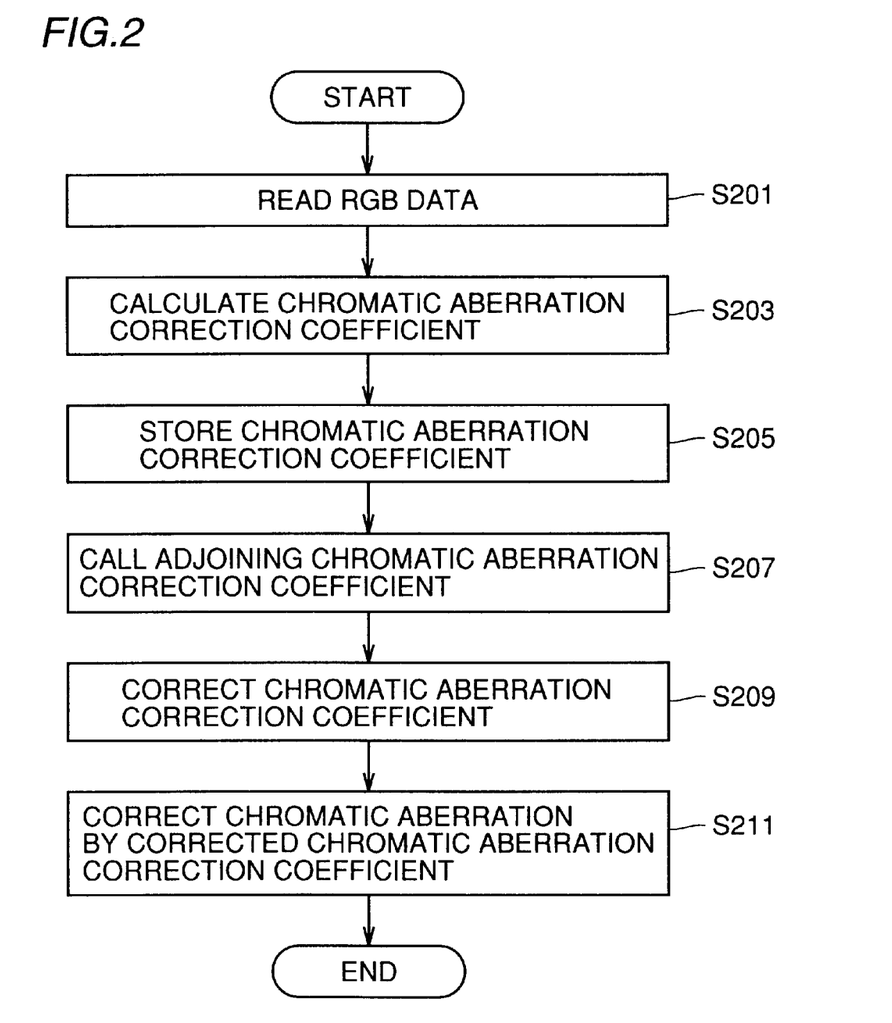
FIG. 2 is a flowchart generally showing a flow of processing in the image processing apparatus in FIG. 1.

FIG. 2 is a flowchart generally showing a flow of processing in image processing apparatus 1 in FIG. 1. Referring to FIG. 2, in image processing apparatus 1, the RGB data read by reading unit 101 is read out in step S201. The RGB data here is obtained by reading a predetermined original document having a pattern of a thin black line, for example. However, the data may be the one which is obtained by reading a predetermined pattern arranged in advance in the vicinity of a platen instead of any original document.

In step S203, a chromatic aberration correction coefficient is calculated by correction coefficient calculating unit 103. In step S205, the chromatic aberration correction coefficient calculated in step S203 is stored in memory unit 105.

In step S207, a chromatic aberration correction coefficient for a pixel adjoining a target pixel that is stored in memory unit 105 is called. In step S209, a chromatic aberration correction coefficient for the target pixel is corrected. Specifically, the chromatic aberration correction coefficient for the target pixel is corrected by correction coefficient correcting unit 107 using the adjoining chromatic aberration correction coefficient (chromatic aberration correction coefficient for a pixel adjoining the target pixel) which is called in step S207.

In step S211, chromatic aberration is corrected by using the chromatic aberration correction coefficient corrected in step S209. Specifically, RGB data of the target pixel read by reading unit 101 is corrected for chromatic aberration by chromatic aberration correcting unit 109 using the corrected chromatic aberration correction coefficient. This is a general flow of the processing in image processing apparatus 1.

Figure 3:
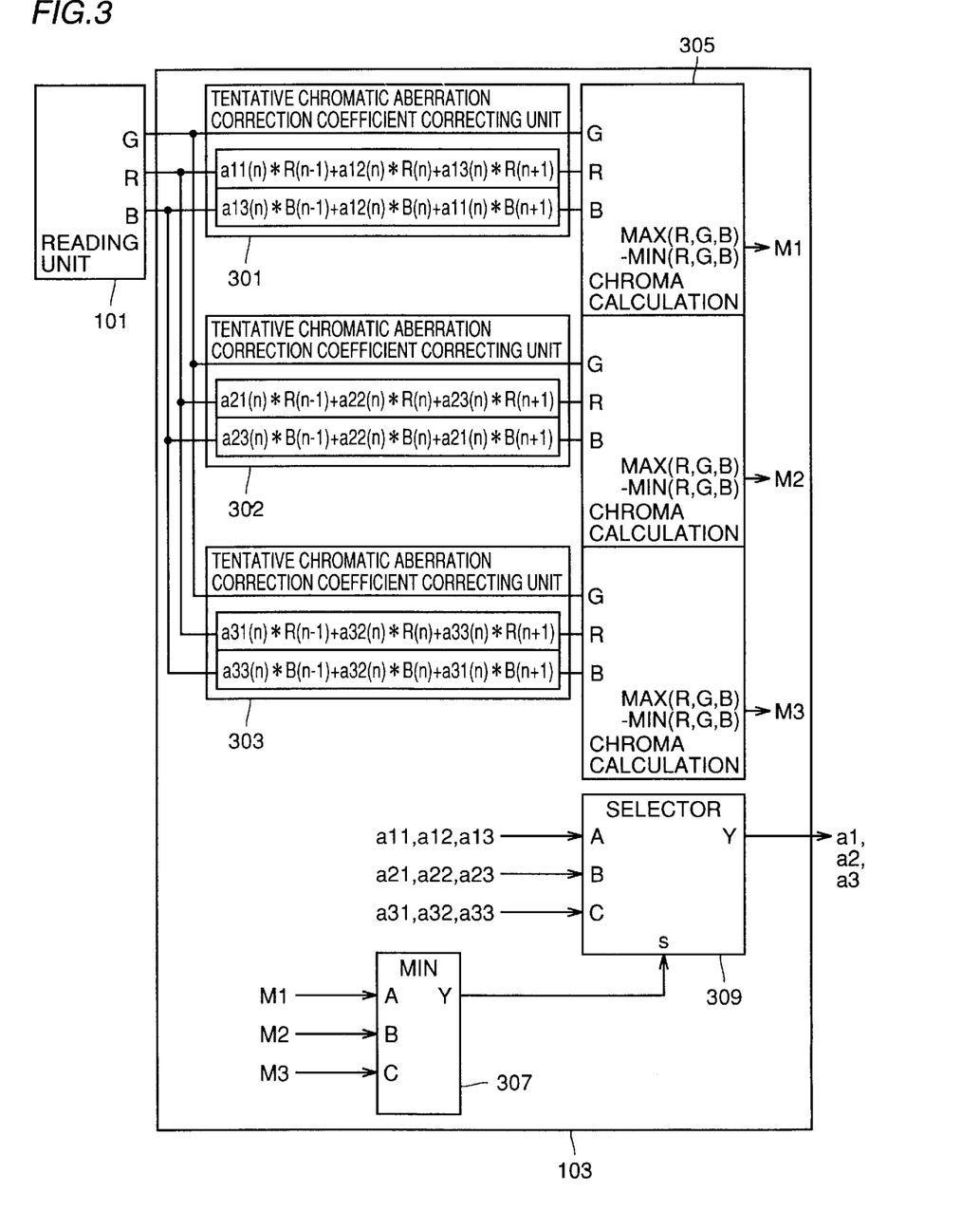
FIG. 3 is a block diagram illustrating a process of calculating a chromatic aberration correction coefficient (step S203) in FIG. 2.

Processing steps are each described now in detail. FIG. 3 is a block diagram illustrating a process of calculating a chromatic aberration correction coefficient (step S203) in FIG. 2. Referring to FIG. 3, correction coefficients a1, a2 and a3 are calculated by correction coefficient calculating unit 103 from the RGB data obtained from reading unit 101.

Correction coefficient calculating unit 103 is constituted of tentative chromatic aberration correcting units 301, 302 and 303 for correcting the RGB data read by reading unit 101 for chromatic aberration by using predetermined three sets of chromatic aberration correction coefficients ([a11, a12, a13], [a21, a22, a23], [a31, a32, a33]), achroma calculating unit 305 for determining chroma data (MAX(R, G, B)–MIN(R, G, B)) from the RGB data corrected by respective tentative chromatic aberration correcting units 301–303, a MIN unit 307 for determining the minimum value (Y) of the determined chroma data (M1, M2, M3) of respective blocks (i.e., chroma data regarding respective RGB data corrected by tentative chromatic aberration correcting units 301–303 respectively), and a selector unit 309 selecting a set of correction coefficients ([a1, a2, a3]) corresponding to the determined minimum value Y.

This correction coefficient calculating unit 103 thus calculates chromatic aberration correction coefficients in the same manner as that for calculating chromatic aberration correction coefficients according to the conventional art illustrated in FIG. 13. In other words, the chromatic aberration correction coefficients calculated here are those allowing the chroma data of any block to be minimum for respective colors, among the predetermined three sets of chromatic aberration correction coefficients.

Figure 4:
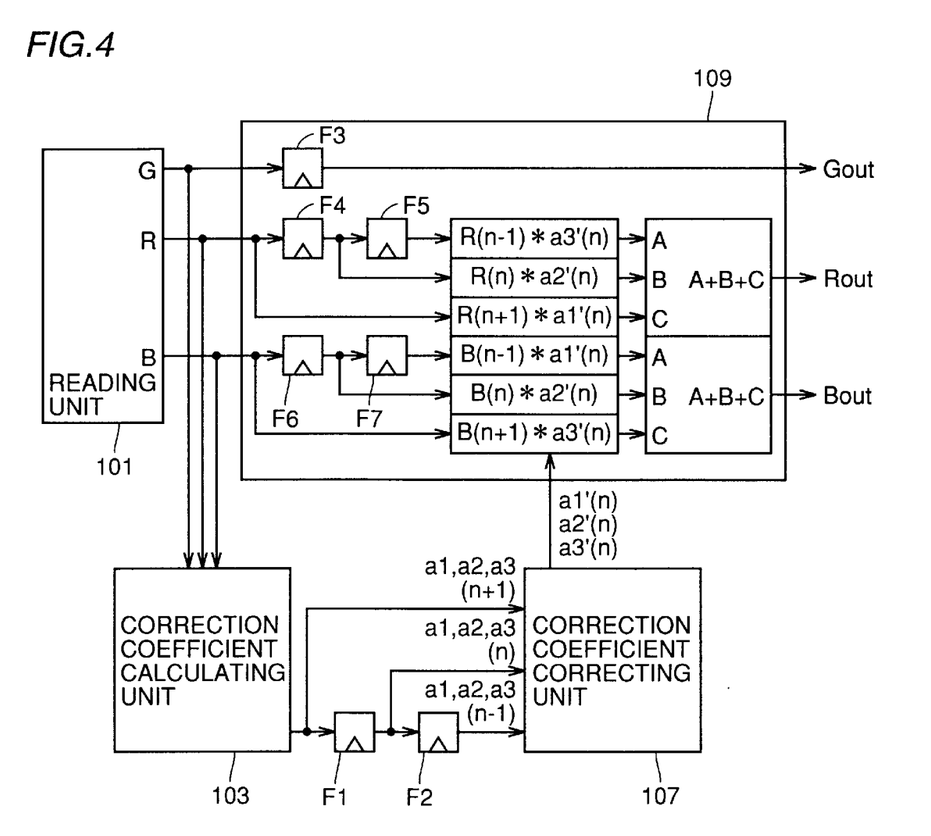
FIG. 4 is a block diagram illustrating in detail respective processes in steps S205–S211 in FIG. 2.

FIG. 4 is a block diagram specifically illustrating respective processes in steps S205–S211 in FIG. 2. Referring to FIG. 4, correction coefficients for a target pixel are corrected by one-dimensional matrixing operation.

Specifically, the correction coefficients determined by the method shown in FIG. 3 are delayed by flip-flops F1 and F2. An arithmetic operation for correcting chromatic aberration correction coefficients for the target pixel is performed by using the target pixel and pixels preceding and following the target pixel corresponding to a one-dimensional matrix.

When the calculated chromatic aberration correction coefficients for a certain pixel are output from correction coefficient calculating unit 103, these correction coefficients correspond to adjoining correction coefficients [a1(n+1), a2(n+1), a3(n+1)] for correcting correction coefficients [a1(n), a2(n), a3(n)] for an immediately preceding pixel. The correction coefficients are thus called by correction coefficient correcting unit 107 as the adjoining correction coefficients at first.

The correction coefficients are next delayed by flip-flop F1 and those correspond to correction coefficients [a1(n), a2(n), a3(n)] for a target pixel. The correction coefficients are thus called by correction coefficient correcting unit 107 as chromatic aberration correction coefficients for the target pixel. At this time, correction coefficients for an immediately preceding pixel [a1(n−1), a2(n−1), a3(n−1)] that are delayed by flip-flop F2 and correction coefficients for an immediately following pixel [a1(n+1), a2(n+1), a3(n+1)] that have just been calculated are called as adjoining correction coefficients.

The correction coefficients delayed by flip-flop F2 are called by correction coefficient correcting unit 107 as adjoining chromatic aberration correction coefficients for an immediately following pixel.

In the correction coefficient correcting unit 107, the correction coefficients [a1(n), a2(n), a3(n)] for the target pixel are corrected by using the correction coefficients corresponding to a one-dimensional matrix. Resultant corrected correction coefficients [a1'(n), a2'(n), a3'(n)] are then transmitted to chromatic aberration correcting unit 109.

In chromatic aberration correcting unit 109, RGB data read by reading unit 101 is delayed by flip-flops F3–F7 to obtain data necessary for the target pixel and data for pixels respectively preceding and following the target pixel. Regarding RB data, chromatic aberration is corrected through multiplication of transmitted correction coefficients and the RB data and addition of resultant products.

Accordingly, the flip-flops are employed as memory unit 105 for obtaining chromatic aberration correction coefficients for a target pixel and pixels adjoining (preceding and following) the target pixel for the one-dimensional 1×3 matrixing operation.

Figure 5:
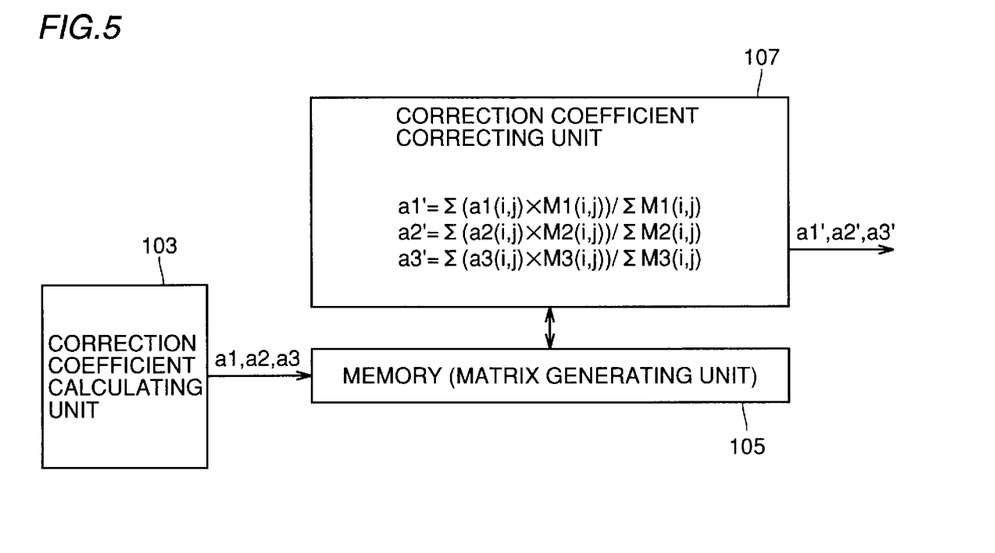
FIG. 5 illustrates in detail a correction method performed by a correction coefficient correcting unit.
Figure 6:
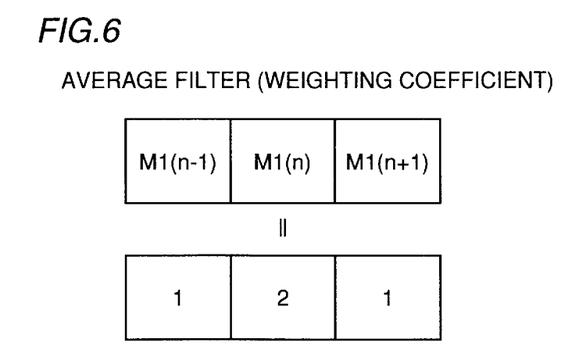
FIG. 6 shows one example of a weighting filter of a 1×3 matrix used in the correction coefficient correcting unit.

A correction method performed by correction coefficient correcting unit 107 is specifically described now in conjunction with FIG. 5. The method of correcting chromatic aberration correction coefficients uses an average filter. Here, [a1(i, j), a2(i, j), a3(i, j)] represents correction coefficients calculated by correction coefficient calculating unit 103 and [M1(i, j), M2(i, j), M3(i, j)] represents weighting coefficients. FIG. 6 shows one example of a weighting filter of a 1×3 matrix used in correction coefficient correcting unit 107.

Referring to FIGS. 5 and 6, the chromatic aberration correction coefficients [a1(i, j), a2(i, j), a3(i, j)] for each matrix that are calculated by correction coefficient calculating unit 103 are multiplied by the weighting coefficients. Then, an average is determined of resultant products regarding correction coefficients and adjoining correction coefficients.

Here, the one-dimensional 1×3 matrix for a target pixel and adjoining pixels preceding and following the target pixel is used to determine an average. The averaging regarding chromatic aberration correction coefficient a1 is specifically shown below, where [M1(1, n−1), M1(1, n), M1(1, n+1)]= [1, 2, 1] from FIG. 6:

$$a1'(1, n)=(a1(1, n-1)*1+a1(1, n)*2+a1(1, n+1)*1)/(1+2+1).$$

Correction for a2 and a3 is similarly performed by using adjoining chromatic aberration correction coefficients.

In this way, an average is determined of chromatic aberration correction coefficients for a predetermined region and accordingly an average chromatic aberration correction coefficient is calculated. Therefore, it is possible to avoid an inconvenient situation in which selected coefficients for pixels adjoining each other produce respective effects entirely opposite to each other. In particular, this average filter advantageously has a light circuit load and is easily implemented as hardware.

Figure 7A:
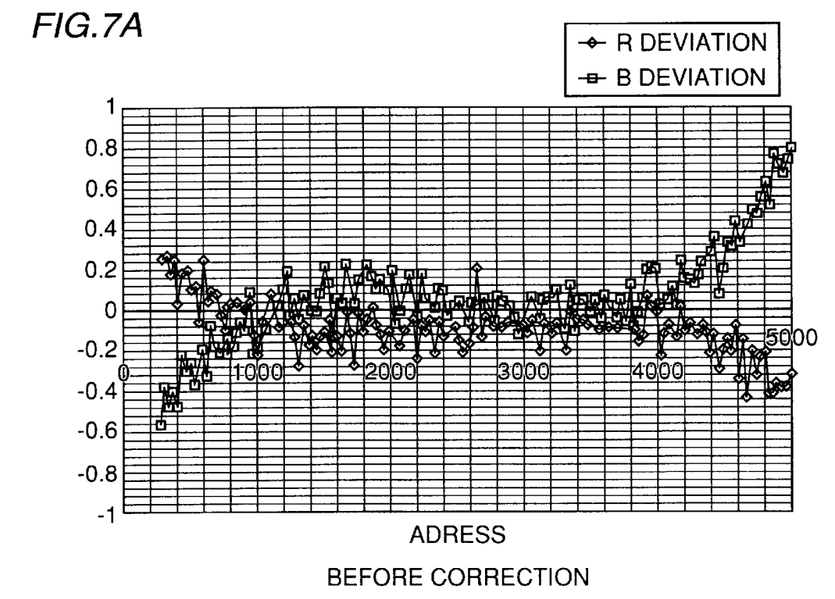
FIGS. 7A and 7B respectively show chromatic aberration correction coefficients before correction and those after correction, illustrating a result of correcting chromatic aberration correction coefficients in the image processing apparatus according to the first embodiment.
Figure 7B:
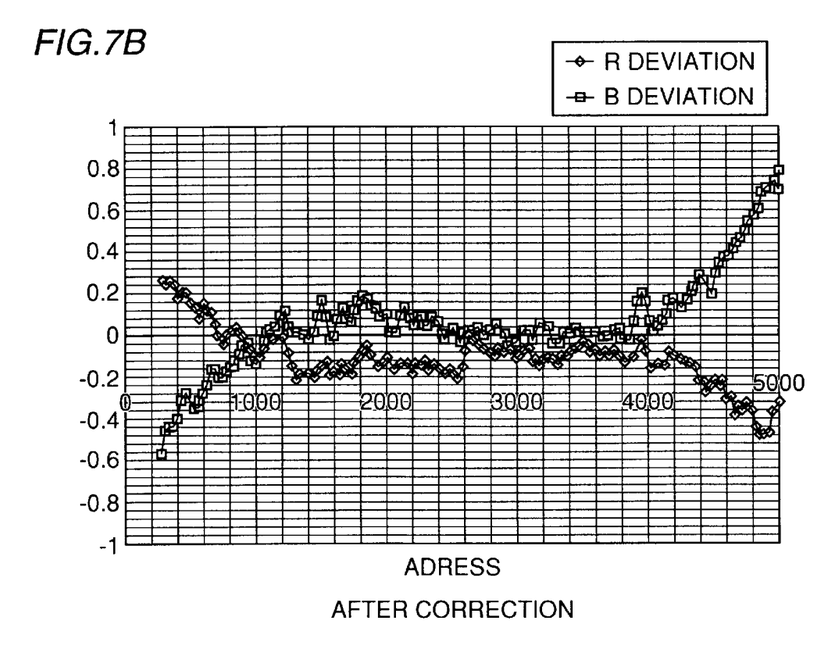

FIGS. 7A and 7B illustrate a result of correcting chromatic aberration correction coefficients in image processing apparatus 1 according to the first embodiment. FIG. 7A shows chromatic aberration correction coefficients before correction for comparison with those after correction shown in FIG. 7B. An address in the main scanning direction is represented by abscissa and a correction coefficient is represented by ordinate in FIGS. 7A and 7B.

Both ends of the graph correspond to pixels associated with reflected light rays passing through the edge region of a lens. The greater absolute value of the correction coefficient means that R and G deviate greater from G, i.e., there is a considerable influence of chromatic aberration.

Referring to FIG. 7A, chromatic aberration correction coefficients which have not been corrected are significantly irregular. In an extreme case, chromatic aberration correction coefficients for respective pixels adjacent to each other respectively exhibit effects entirely opposite to each other. This is because a correction coefficient is selected to allow chroma to be minimum all the time. In this case, even if a green thin line is to be printed, employed correction coefficients produce a low chroma so that the actually printed line is the one corrected to a darkish color.

Referring to FIG. 7B, corrected chromatic aberration correction coefficients are considerably stable to form a relatively smooth line without exhibiting such an irregularity as those before correction, since the average filter is applied for a region including pixels adjacent to each other. Therefore, a thin green line can be reproduced, for example.

As heretofore described, in image processing apparatus 1 according to the first embodiment, chromatic aberration correction coefficients calculated to allow chroma to be minimum are averaged by using adjoining chromatic aberration correction coefficients. It is thus possible to determine correction coefficients suitable for an actual chromatic aberration.

There are thus less inconvenient situations in which chromatic aberration correction coefficients used for pixels adjoining each other produce entirely opposite effects respectively. Then, for example, a thin line of a single color such as RGB can accurately be reproduced.

Although three sets of chromatic aberration correction coefficients, for example, [0, ¾, ¼], [0, 1, 0] and [¼, ¾, 0] are used for correction coefficient calculating unit 103 to determine correction coefficients, the correction coefficients are not limited those. Specifically, the number of tentative chromatic aberration correcting units in FIG. 3 may be increased to use five sets of correction coefficients [0, ⅞, ⅛], [0, ¾, ¼], [0, 1, 0], [⅛, ⅞, 0] and [¼, ¾, 0] or more. Increased number of sets of correction coefficients can enhance accuracy of chromatic aberration correction.

The correction coefficient correction unit 107 using adjoining chromatic aberration correction coefficients for making correction may employ a matrix of several dimensions instead of the one-dimensional matrix. In this case, although a line memory and the like are required, a more accurate correction can be achieved.

In the block diagram shown in FIG. 4, although flip-flops delay coefficients of pixels corresponding to the matrix to successively perform the operation, another method may be employed. For example, a line memory and the like may used in memory unit 105 in FIG. 1 to store all of a certain number of correction coefficients calculated by correction coefficient calculating unit 103 and then perform all operations for correction by correction coefficient correcting unit 107.

Although the method employed for calculating chromatic aberration correction coefficients in step S203 in FIG. 2 is the same as that according to the conventional art in which optimum coefficients are selected from a plurality of sets of chromatic aberration correction coefficients, another method may be used. For example, the method disclosed in Japanese Patent Laying-Open No. 11-69105 or any other method may be employed.

Second Embodiment

An image processing apparatus according to the second embodiment of the invention is described now. The image processing apparatus has an entire structure substantially similar to that of image processing apparatus 1 in FIG. 1 according to the first embodiment. A difference is that correction coefficient correcting unit 107 in FIG. 1 is replaced with a correction coefficient correcting unit 807. Correction coefficient correcting unit 107 in FIG. 1 corrects chromatic aberration correction coefficients by using the average filter while a median filter is used for correction in the second embodiment.

Figure 8:
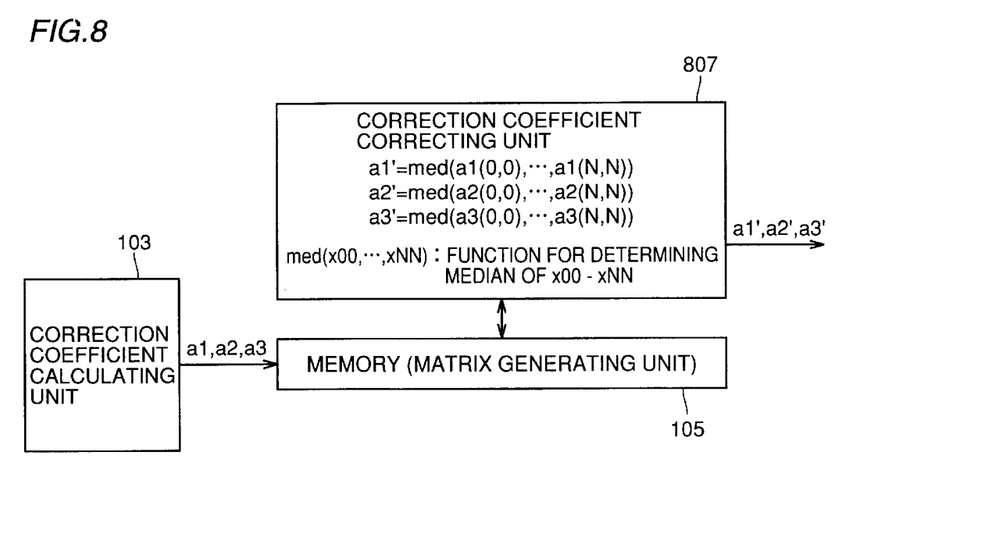
FIG. 8 illustrates a correction method performed by a correction coefficient correcting unit in an image processing apparatus according to a second embodiment.

FIG. 8 illustrates a correction method performed by correction coefficient correcting unit 807 in the image processing apparatus according to the second embodiment. Here, med (X00, ..., XNN) is a function for determining a median of X00–XNN. Referring to FIG. 8, chromatic aberration correction coefficients a1, a2 and a3 calculated by a correction coefficient calculating unit 103 are stored in a memory unit 105 where a matrix of chromatic aberration correction coefficients for predetermined pixels (adjoining pixels) including a target pixel is generated.

In correction coefficient correcting unit 807, chromatic aberration correction coefficients in a predetermined region (matrix) are called and a median in the matrix is determined to correct chromatic aberration correction coefficients for the target pixel. Use of such a median filter enables spike noise produced in chromatic aberration correction coefficients to be eliminated and accordingly chromatic aberration can more properly be corrected.

Third Embodiment

An image processing apparatus according to the third embodiment of the invention is described now. The image processing apparatus also has an entire structure substantially similar to that of image processing apparatus 1 in FIG. 1 according to the first embodiment. A difference is that correction coefficient correcting unit 107 in FIG. 1 is replaced with a correction coefficient correcting unit 907. Correction coefficient correcting unit 107 in FIG. 1 corrects chromatic aberration correction coefficients by the average filter while a morphology filter is used for making correction (expansion and erosion processing) in the third embodiment.

Figure 9:
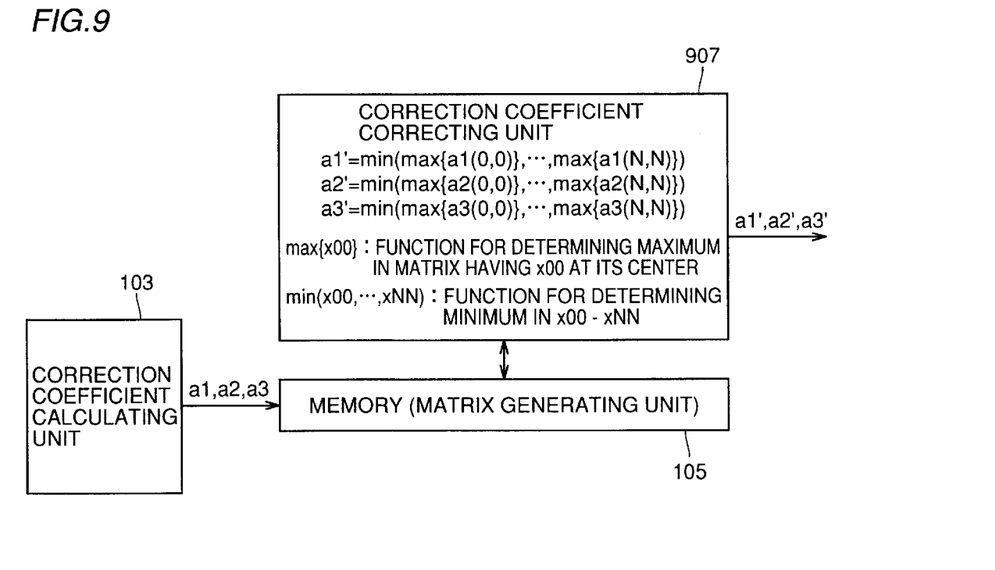
FIG. 9 illustrates a correction method performed by a correction coefficient correcting unit in an image processing apparatus according to a third embodiment.

FIG. 9 illustrates a correction method performed by correction coefficient correcting unit 907 in the image processing apparatus according to the third embodiment. Max (X00) is a function for determining the maximum value in a matrix having X00 at its center. Min (X00, ..., XNN) is a function for determining the minimum value of X00–XNN.

Referring to FIG. 9, chromatic aberration correction coefficients a1, a2 and a3 calculated by a correction coefficient calculating unit 103 are stored temporarily in a memory unit 105 where a matrix of chromatic aberration correction coefficients for predetermined pixels including a target pixel is produced.

In correction coefficient correcting unit 907, chromatic aberration correction coefficients in a predetermined region (matrix) are called for performing expansion and erosion processing. Specifically, the maximum value in the matrix is first determined. Next, the minimum value within the determined maximum value in the predetermined region is determined. In this way, so-called expansion and erosion processing is performed for correcting chromatic aberration correction coefficients. It is thus possible to eliminate noise and the like occurring in chromatic aberration correction coefficients and accordingly to achieve a more appropriate correction of chromatic aberration.

Although the maximum value is first determined and then the minimum value is determined in a predetermined region, on the contrary, the maximum value may be determined after the minimum value is determined. Alternatively, one of the maximum and minimum values may be determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
    an image reading unit;
    a calculating unit calculating a chromatic aberration correction coefficient using image data read by said image reading unit;
    a first correcting unit correcting said calculated chromatic aberration correction coefficient; and
    a second correcting unit correcting image data of an original read by said image reading unit by using said corrected chromatic aberration correction coefficient.

2. The image processing apparatus according to claim 1, further comprising a storing unit storing said calculated chromatic aberration correction coefficient, wherein
    said first correcting unit includes
        a first reading unit reading from said storing unit said stored chromatic aberration correction coefficient, and
        a second reading unit reading from said storing unit a chromatic aberration correction coefficient adjoining said read chromatic aberration correction coefficient, and
        the chromatic aberration correction coefficient read by said first reading unit is corrected by using the adjoining chromatic aberration correction coefficient read by said second reading unit.

3. The image processing apparatus according to claim 2, wherein
    said first correcting unit corrects the chromatic aberration correction coefficient read by said first reading unit by taking an average of the chromatic aberration correction coefficient read by said first reading unit and the adjoining chromatic aberration correction coefficient read by said second reading unit.

4. The image processing apparatus according to claim 2, wherein
    said first correcting unit corrects the chromatic aberration correction coefficient read by said first reading unit by taking a median of the chromatic aberration correction coefficient read by said first reading unit and the adjoining chromatic aberration correction coefficient read by said second reading unit.

5. The image processing apparatus according to claim 2, wherein
    said first correcting unit corrects the chromatic aberration correction coefficient read by said first reading unit by performing expansion and erosion processing, using the adjoining chromatic aberration correction coefficient read by said second reading unit, on the chromatic aberration correction coefficient read by said first reading unit.

6. The image processing apparatus according to claim 1, wherein
    said calculating unit performs arithmetic operation for correcting chromatic aberration by using a plurality of chromatic aberration correction coefficients and selects a chromatic aberration correction coefficient which allows chroma data obtained by the arithmetic operation to be minimum.

7. The image processing apparatus according to claim 1, wherein
    said second correcting unit multiplies said image data by said corrected chromatic aberration correction coefficient and performs addition on resultant products to correct said image data.

8. An image processing apparatus comprising:

an image reading unit;

a calculating unit calculating a chromatic aberration correction coefficient for each pixel in a main scanning direction by using image data read by said image reading unit;

a first correcting unit correcting a chromatic aberration correction coefficient for a target pixel by using a chromatic aberration correction coefficient for a pixel adjoining said target pixel; and a second correcting unit correcting image data of an original read by said image reading unit by using said corrected chromatic aberration correction coefficient.

9. The image processing apparatus according to claim 8, wherein said first correcting unit corrects the chromatic aberration correction coefficient by performing matrixing operation based on an average filter.

10. The image processing apparatus according to claim 8, wherein said first correcting unit corrects the chromatic aberration correction coefficient by performing matrixing operation based on a median filter.

11. The image processing apparatus according to claim 8, wherein said first correcting unit corrects the chromatic aberration correction coefficient by performing matrixing operation based on a morphology filter.

12. The image processing apparatus according to claim 8, wherein said calculating unit performs arithmetic operation for correcting chromatic aberration of image data for each pixel by using a plurality of chromatic aberration correction coefficients and selects a chromatic aberration correction coefficient which allows chroma data obtained by the arithmetic operation to be minimum.

13. The image processing apparatus according to claim 8, wherein said second correcting unit multiplies said image data by said corrected chromatic aberration correction coefficient and performs addition on resultant products to correct said image data.

14. An image processing method for correcting chromatic aberration of image data read by an image reading unit, comprising the steps of:

calculating a chromatic aberration correction coefficient by using the image data read by the image reading unit;

correcting said calculated chromatic aberration correction coefficient; and correcting image data of an original read by said image reading unit by using said corrected chromatic aberration correction coefficient.

* * * * *